United States Patent [19]
Karl

[11] Patent Number: 6,041,849
[45] Date of Patent: Mar. 28, 2000

[54] HEATING DEVICE FOR VEHICLE USING THE COOLANT FLUID CIRCUIT

[75] Inventor: Stefan Karl, Paris, France

[73] Assignee: Valeo Climatisation, La Verriere, France

[21] Appl. No.: 08/930,882

[22] PCT Filed: Jan. 17, 1997

[86] PCT No.: PCT/FR97/00083

§ 371 Date: Jan. 2, 1998

§ 102(e) Date: Jan. 2, 1998

[87] PCT Pub. No.: WO97/28015

PCT Pub. Date: Aug. 7, 1997

[30] Foreign Application Priority Data

Jan. 31, 1996 [FR] France .................................. 96/01164

[51] Int. Cl.[7] .................................................. B60H 3/00
[52] U.S. Cl. ............................. 165/42; 165/41; 165/202; 165/43; 62/244
[58] Field of Search ................................ 165/41, 42, 43, 165/202; 62/244, 324.1, 324.6

[56] References Cited

U.S. PATENT DOCUMENTS

| | | | |
|---|---|---|---|
| 4,893,748 | 1/1990 | Balducci | 165/42 |
| 4,909,044 | 3/1990 | Gudmundsen | 165/43 |
| 5,085,269 | 2/1992 | Aoki | 165/43 |
| 5,483,807 | 1/1996 | Abersfelder | 165/43 |
| 5,488,837 | 2/1996 | Sekino et al. | 62/244 |
| 5,528,900 | 6/1996 | Prasad | 62/244 |
| 5,531,264 | 7/1996 | Eike | 165/43 |
| 5,555,737 | 9/1996 | Takeo et al. | 62/244 |

*Primary Examiner*—Ira S. Lazarus
*Assistant Examiner*—Terrell McKinnon
*Attorney, Agent, or Firm*—Morgan & Finnegan, LLP

[57] ABSTRACT

In the heating mode, the fluid in the air conditioning circuit flows in a bypass branch avoiding the condenser. The evaporator then receives the fluid in the gaseous state and acts as a heat exchanger for dissipating the heat produced in the compressor. The heat dissipated by the evaporator can be used for heating the cabin when that which is produced by the propulsion engine of the vehicle is insufficient.

In addition, the fluid pressure at the inlet of the evaporator, and therefor the calorific power produced by the latter, is adjusted by a pressure regulator disposed in the bypass branch.

30 Claims, 1 Drawing Sheet

HEATING DEVICE FOR VEHICLE USING THE COOLANT FLUID CIRCUIT

CROSS-REFERENCE TO RELATED APPLICATIONS

The present application claims the benefit of previously filed French patent application 96.01164 filed in France on Jan. 31, 1996 and PCT international application FR97/00083 filed on Jan. 17, 1997 to which the instant application corresponds.

FIELD OF THE INVENTION

This invention relates to a method for modifying the temperature of a stream of air to be delivered into the cabin of a vehicle, by heat exchange with an evaporator in which there flows a fluid which also passes through a compressor and through an expansion device, the said method including a cooling mode for cooling the stream of air, in which the said fluid is caused to flow through, in succession, the evaporator, the compressor, a condenser in which it yields heat to another medium, and an expansion device.

BACKGROUND OF THE INVENTION

Such a method is conventionally used for the air conditioning of the cabin of the vehicle, especially a vehicle having a heat engine or an electric motor. When heating of the air to be passed into the cabin is required, the heat produced by the engine is commonly used, for example by causing the stream of air in contact with a heating radiator through which a coolant fluid for the engine passes.

When the engine is cold, it is not possible to draw heat from it for heating the cabin, and this delays the achievement of the desired temperature in the latter and is therefore detrimental to the comfort of the occupants. In some cases, the coolant liquid never does reach a high enough temperature during the journey to give a comfortable temperature in the cabin.

In order to get the cabin up to temperature more quickly, recourse can be had to additional devices, in particular those comprising burners or electric radiators, which involve high costs.

FR-A-2 717 126, on the other hand, proposes modification of the process by a heating mode for the stream of air, in which the fluid leaving the compressor is passed to the evaporator without passing through a condenser.

The heating mode that can be used for heating the cabin, especially when the engine is cold, thus depends on the existing air conditioning installation with minor modifications.

However, the calorific power generated in the heating mode is determined by the mass flow produced by the compressor, which is itself a function of the speed at which it is driven, and consequently a function of the running mode of the engine. This power can be either greater or less than that necessary for the heating of the cabin. In particular, in the event of starting at low temperature, the initial density of the fluid in the air conditioning circuit, and consequently the mass flow produced by the compressor, is insufficient to give satisfactory heating.

BRIEF SUMMARY OF THE INVENTION

The object of the invention is to adapt the calorific power produced by the evaporator to the heating demand of the vehicle, for all circumstances.

The invention is directed in particular to a method of the kind defined in the introduction hereof, and provides that, in the heating mode, the pressure of the fluid at the inlet of the evaporator is so controlled as to regulate the calorific power produced, and, when the mass of fluid flowing in the evaporator is insufficient to provide the required pressure, fluid is transferred from the condenser into the evaporator.

The invention firstly enables the calorific power to be adjusted up or down by virtue of the fluid pressure, and secondly it enables the reserve of fluid in the liquid state contained in the condenser to be used for augmenting the quantity of fluid flowing in the heating mode, in such a way as to augment the mass flow and the calorific power at a given speed of the compressor.

Optional features of the invention, complementary or alternative, are set forth below:

the fluid is expanded by an expansion device in the cooling mode and by a controlled pressure regulator, implementing the control of the pressure of the fluid at the inlet of the evaporator, in the heating mode.

the evaporator acts as an evaporator in the cooling mode and acts only as a heat exchanger in the heating mode.

the vehicle has a propulsion engine which releases heat in operation, and the heating mode is used for heating the cabin in those periods in which the heat released by the engine is insufficient for that purpose.

The invention also provides an air conditioning installation for the cabin of a motor vehicle, comprising a fluid circuit having a first branch containing an evaporator followed by a compressor, a second branch containing a condenser, and a third branch containing no condenser, the second and third branches being in parallel with each other so as respectively to constitute, with the first branch, a cooling loop which also contains an expansion device interposed between the condenser and the evaporator, and a heating loop, together with flow diverting means for controlling the flow of fluid either into the cooling loop or into the heating loop, the installation further including means for delivering into the cabin air which has undergone heat exchange with the evaporator, characterized in that the heating loop contains a controlled pressure regulator adapted to enable the pressure of the fluid delivered into the evaporator to be fixed at a selected value, and in that fluid transfer means are provided for transferring into the heating loop, when the latter is established by the flow diverting means, some of the fluid contained in the second branch.

The installation according to the invention may; include at least some of the following features:

the expansion device and the pressure regulator are placed in the second branch and in the third branch respectively.

the fluid transfer means comprise a fourth branch joining the second branch to a junction point located on the first branch between the outlet of the evaporator and the inlet of the compressor, and being adapted to enable fluid to flow exclusively from the second branch towards the said junction point, and a stop valve, which is interposed in the first branch between the evaporator and the junction point and which is controlled in such a way as to interrupt the flow of fluid exclusively when the heating loop is established by the flow diverting means, and for a limited period.

the flow diverting means comprise a four-way valve connected to the downstream ends of the first and fourth branches and to the upstream ends of the second and third branches, being adapted to assume a first position in which it puts the first and second branches into mutual relationship so as to establish the cooling loop, and a second position in which it puts into relationship with each other, firstly the first and third branches so as to establish the heating loop, and secondly the second and fourth branches so as to activate the transfer means when the stop valve is closed.

the four-way valve, in its first position, also puts into relationship with each other the third and fourth branches, and unidirectional flow means are provided for preventing flow of the fluid in the third branch towards the four-way valve.

unidirectional flow means are provided for permitting flow of the fluid in the second branch, downstream of the condenser, only towards the evaporator and only at a given differential pressure.

The features and advantages of the invention will be explained in greater detail in the following description, with reference to the attached drawings.

DETAILED DESCRIPTION OF THE INVENTION

Figure 1:
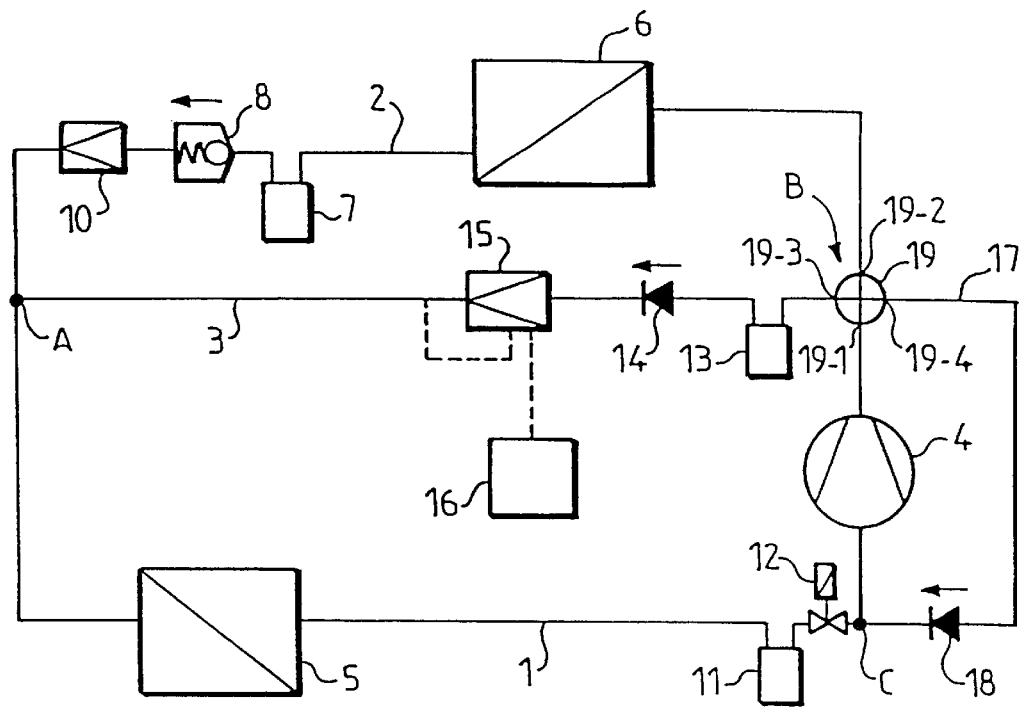
FIG. 1 is a diagram of the fluid circuit in an installation in accordance with the invention for the air conditioning and heating of the cabin of a vehicle, in the cooling mode of the method according to the invention.

There flows in this circuit a fluid which passes from the liquid state to a gaseous state by absorbing heat, and from the gaseous state to the liquid state by yielding heat, as is normally the case in vehicle air conditioning installations. The components of the circuit are also normally found in these air conditioning installations.

The circuit shown comprises three branches 1, 2 and 3 which are joined together at two junction points A and B. The branch 1 contains a compressor 4, which drives the fluid in it from the point A towards the point B, and an evaporator which is connected upstream of the compressor. The branch 2 contains, going from the point B towards the point A, a condenser 6, a bottle 7, a non-return valve 8 with integral differential pressure regulation, and an expansion device 10. A fluid accumulator 11 and a stop valve 12 are interposed, in that order, in the branch 1 between the evaporator 5 and the compressor 4. In the branch 3, going from the point B towards the point A, there are connected a fluid reservoir 13, a non-return valve 14 and a pressure regulator 15, which is associated with a control unit 16.

A fourth branch 17 of the circuit connects the point B to a point C in the branch 1 between the valve 12 and the compressor 4, and contains a non-return valve 18 which permits flow of the fluid only from the point B towards the point C. A four-way electromechanical valve 19 is located at the junction point B, so that its four ports 19-1, 19-2, 19-3 and 19-4 are connected respectively to the downstream end of the first branch, that is to say to the outlet of the compressor 4, to the upstream end of the second branch, that is to say to the inlet of the condenser 6, and to the upstream ends of the third and fourth branches.

The electromechanical valve 19 is so controlled as to adopt two positions corresponding respectively to the two Figures. In that of FIG. 1, the valve puts into communication with each other, firstly its ports denoted 19-1 and 19-2, and secondly its ports denoted 19-3 and 19-4. The fluid then flows in a closed loop constituted by the branches 1 and 2, with the non-return valves 14 and 18 preventing any flow between the other two branches. This loop, works as a conventional air conditioning circuit, with the fluid passing from the liquid state to the gaseous state in the evaporator 5 by absorbing heat, and from the gaseous state to the liquid state in the condenser 6 by yielding heat. The heat absorbed in the evaporator 5 can be taken, directly or indirectly, into a stream of air to be delivered into the cabin of the vehicle.

Figure 2:
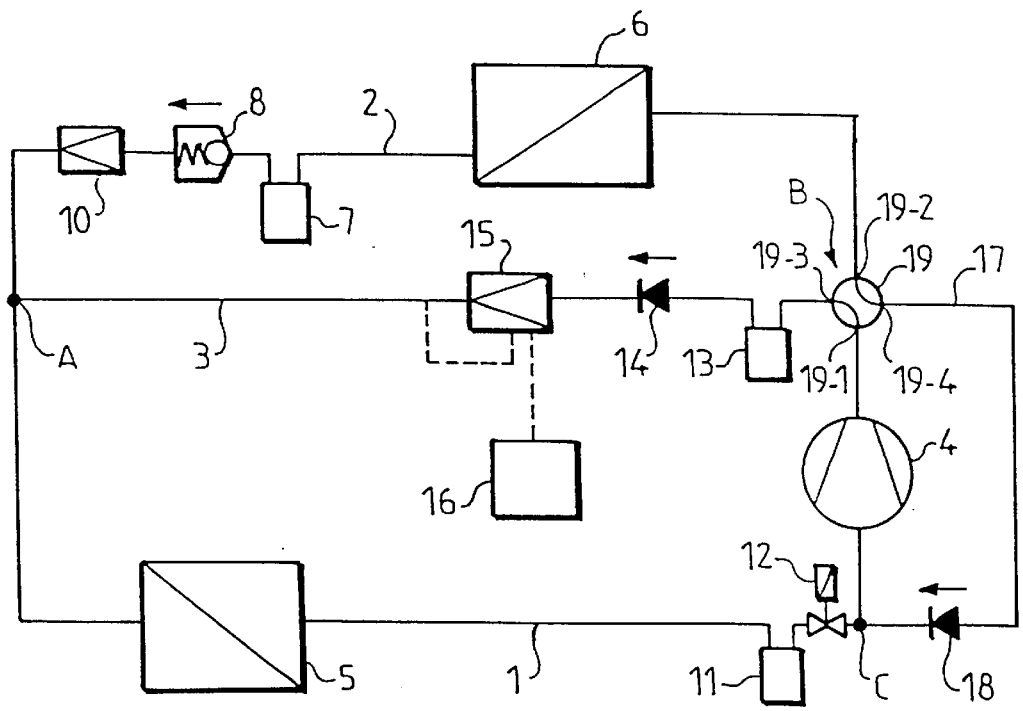
FIG. 2 is a diagram of the fluid circuit in an installation in accordance with the invention for the air conditioning and heating of the cabin of a vehicle, in the heating mode of the method according to the invention.

In the configuration of FIG. 2, the valve 19 puts into communication with each other, firstly its ports 19-1 and 19-3, and secondly its ports 19-2 and 19-4. The fluid therefore flows, when the valve 12 is open, in a closed loop constituted by the branches 1 and 3. The fluid then passes through the compressor 4, the pressure regulator 15 which provides pressure reduction, and the evaporator 5. The non-return valve 8 prevents it from reaching the condenser from the point A. Since it no longer passes through the condenser, the fluid remains permanently in the gaseous state. The evaporator 5 no longer works as an evaporator, but it does continue to act as a heat exchanger, enabling much of the heat produced by the compression of the fluid in the compressor 4 to be dissipated, and this heat can be used for heating the cabin when the heat engine of the vehicle is cold. In particular, since the fluid in circulation is at a temperature which is greater than ambient temperature, a stream of air to be delivered into the cabin can be heated by direct contact with the evaporator.

The unit 16 controls the pressure regulator 15, in such a way as to obtain a desired fluid pressure at the outlet of the latter, and consequently at the inlet of the evaporator 5. In this connection, it is the pressure of the fluid entering the evaporator that determines the calorific power produced by the latter. The pressure setting is for example calculated from the temperature of the outside atmosphere and the temperature within the cabin. If the pressure at the outlet of the regulator 15 remains lower than the set value, the unit 16 causes the valve 12 to close momentarily. The fluid aspired by the compressor 4 then necessarily comes from the condenser 6 through the branch 17, and augments the mass of fluid contained in the loop 1, 3. The valve 12 is once again opened, for example at the end of a fixed closure time, or after the compressor has performed a fixed number of rotations since it was closed. The fluid pressure at the outlet of the valve 12 is now again higher than in the branch 17, and the flow in the latter is again interrupted. Circulation in the closed loop 1, 3 is repeated with an increased mass of fluid, thus giving a corresponding increase, both in the pressure at the outlet of the regulator 15 and in the heat output from the evaporator 5.

I claim:

1. A method comprising modifying the temperature of a stream of air to be delivered into the cabin of a vehicle, by heat exchange with an evaporator in which there flows a fluid which also passes through a compressor and through an expansion device, wherein said method includes (1) a cooling mode for cooling the stream of air, in which said fluid is caused to flow through, in succession, the evaporator, the compressor, a condenser in which it yields heat to another medium, and an expansion device, and (2) a heating mode for heating the stream of air, in which the fluid leaving the compressor is passed to the evaporator without passing through a condenser, and wherein in the heating mode, the pressure of the fluid at the inlet of the evaporator is so controlled as to regulate the calorific power produced, and, when the mass of fluid flowing in the evaporator is insufficient to provide the required pressure, fluid is transferred from the condenser into the evaporator.

2. A method according to claim 1, wherein the fluid is expanded by an expansion device in the cooling mode and by a controlled pressure regulator, implementing the control of the pressure of the fluid at the inlet of the evaporator, in the heating mode.

3. A method according to claim 1, wherein the evaporator acts as an evaporator in the cooling mode and acts only as a heat exchanger in the heating mode.

4. A method according to claim 1, wherein the vehicle has a propulsion engine which releases heat in operation, and wherein the heating mode is used for heating the cabin in those periods in which the heat released by the engine is insufficient for that purpose.

5. An air conditioning installation for the cabin of a motor vehicle, comprising a fluid circuit having a first branch containing an evaporator followed by a compressor, a second branch containing a condenser, and a third branch containing no condenser, the second and third branches being in parallel with each other so as respectively to constitute, with the first branch, a cooling loop which also contains an expansion device interposed between the condenser and the evaporator, and a heating loop, together with flow diverting means for controlling the flow of fluid either into the cooling loop or into the heating loop, the installation further including means for delivering into the cabin air which has undergone heat exchange with the evaporator, wherein the heating loop contains a controlled pressure regulator adapted to enable the pressure of the fluid delivered into the evaporator to be fixed at a selected value, and wherein fluid transfer means are provided for transferring into the heating loop, when the heating loop is established by the flow diverting means, some of the fluid contained in the condenser.

6. An installation according to claim 5, wherein the expansion device and the pressure regulator are placed in the second branch and in the third branch respectively.

7. An installation according to claim 5, wherein the fluid transfer means comprises a fourth branch joining the second branch to a junction point located on the first branch between the outlet of the evaporator and the inlet of the compressor, and is configured to enable fluid to flow exclusively from the second branch towards the said junction point, and a stop valve, which is interposed in the first branch between the evaporator and the junction point and which is controlled in such a way as to interrupt the flow of fluid exclusively when the heating loop is established by the flow diverting means, and for a limited period.

8. An installation according to claim 7, wherein the flow diverting means comprises a four-way valve connected to the downstream ends of the first and fourth branches and to the upstream ends of the second and third branches, and is configured to assume a first position in which it puts the first and second branches into mutual relationship so as to establish the cooling loop, and a second position in which it puts into relationship with each other, firstly the first and third branches so as to establish the heating loop, and secondly the second and fourth branches to as to activate the transfer means when the stop valve is closed.

9. An installation according to claim 8, wherein the four-way valve, in its first position, also puts into relationship with each other the third and fourth branches, and further comprising unidirectional means to prevent flow of the fluid in the third branch towards the four-way valve.

10. An installation according to claim 5, wherein unidirectional flow means are provided for permitting flow of the fluid in the second branch, downstream of the condenser, only toward the evaporator and only at a given differential pressure.

11. An installation according to claim 6, wherein the fluid transfer means comprises a fourth branch joining the second branch to a junction point located on the first branch between the outlet of the evaporator and the inlet of the compressor, and is configured to enable fluid to flow exclusively from the second branch towards the said junction point, and a stop valve, which is interposed in the first branch between the evaporator and the junction point and which is controlled in such a way as to interrupt the flow of fluid exclusively when the heating loop is established by the flow diverting means, and for a limited period.

12. An installation according to claim 6, further comprising unidirectional flow means for permitting flow of the fluid in the second branch, downstream of the condenser, only toward the evaporator and only at a given differential pressure.

13. An installation according to claim 7, further comprising unidirectional flow means for permitting flow of the fluid in the second branch, downstream of the condenser, only toward the evaporator and only at a given differential pressure.

14. An installation according to claim 8, further comprising unidirectional flow means for permitting flow of the fluid in the second branch, downstream of the condenser, only toward the evaporator and only at a given differential pressure.

15. An installation according to claim 9, further comprising unidirectional flow means for permitting flow of the fluid in the second branch, downstream of the condenser, only toward the evaporator and only at a given differential pressure.

16. A method comprising:
in a cooling mode, flowing a refrigerant fluid through a cooling circuit containing an evaporator, a compressor, and a condenser; and
in a heating mode, (a) flowing said fluid through a heating circuit containing said evaporator and said compressor, (b) regulating the pressure at the inlet of said evaporator to regulate the calorific power produced and (c) if the flow of fluid into the evaporator provided insufficient pressure, transferring fluid remaining in said condenser to the heating circuit.

17. A method according to claim 16, wherein the method is for modifying the temperature of a stream of air to be delivered into the cabin of a vehicle with a propulsion engine, and wherein the engine provides heat to the air stream and the heating mode is utilized when heat released by the engine is insufficient.

18. A device comprising:
a cooling circuit containing an evaporator, a compressor, and a condenser;
a heating circuit containing said evaporator, said compressor, and a controlled pressure regulator adapted to regulate mass of fluid flowing into the evaporator;
a control valve configured to establish the cooling circuit or the heating circuit; and
a fluid conduit connecting the condenser and the heating circuit to provide additional fluid when the flow of fluid into the evaporator provides insufficient calorific power.

19. The device of claim 18, further comprising an unidirectional valve downstream of the condenser in the cooling circuit to allow fluid flow only from the condenser to the evaporator, and only at a given differential pressure.

20. The device of claim 19, wherein the unidirectional valve is a non-return valve with integral differential pressure regulation.

21. The device of claim 18, wherein the outlet of the fluid conduit is upstream of the pressure regulator.

22. The device of claim 18, further comprising:
   a non-return valve located within the fluid conduit to allow fluid flow exclusively from the cooling circuit to heating circuit; and
   a stop valve upstream of the outlet of fluid conduit interposed between the evaporator and the inlet of the compressor adapted to initiate fluid transfer through the fluid conduit by closing.

23. The device of claim 18, wherein the control valve comprises a four-way valve connected to the inlet of the condenser, the inlet of the pressure regulator, the inlet of the fluid conduit, and the outlet of the compressor,
   the valve adapted to assume a first position, in which it establishes the cooling circuit, and a second position in which it establishes the heating circuit and establishes a connection between the fluid conduit and the condenser.

24. The device of claim 23, wherein the four-way valve, in its first position, also establishes connection between the fluid conduit and the pressure regulator, and
   the device further comprises a non-return valve configured to prevent flow from the pressure regulator toward the four-way valve.

25. The device of claim 23, wherein the four-way valve is an electromechanical four-way valve.

26. The device of claim 18, further comprising a controller associated with the control valve, the pressure regulator, and the stop valve adapted to regulate the mass of fluid flowing into the evaporator to obtain the calorific power required.

27. The device of claim 26, wherein the controller calculates the calorific power required from the temperature of the outside atmosphere, the temperature within the cabin, and the desired temperature.

28. A device comprising:
   a cooling circuit containing an evaporator, a compressor, and a condenser;
   a heating circuit containing the evaporator, and the compressor and means for regulating the calorific power produced by regulating the mass of fluid flowing into the evaporator; and
   means for transferring fluid from the condenser to the heating circuit when the heating circuit is established and the mass of fluid in the heating circuit is insufficient.

29. A device for conditioning a stream of air to be introduced into the cabin of a vehicle comprising:
   a cooling circuit containing an evaporator, a compressor, a condenser, a nonreturn valve with integral differential pressure regulation, and an expansion device;
   a heating circuit containing said evaporator, said compressor, and a pressure regulator;
   a fluid conduit containing a non-return valve to enable flow of fluid exclusively from the cooling circuit to the heating circuit;
   a four-way electro-mechanical valve at the outlet of the compressor configured to assume a first position, in which it establishes the cooling circuit and prevents flow in the fluid conduit, and a second position in which it establishes the heating circuit;
   a stop valve interposed between the evaporator and the outlet of the fluid conduit; and
   a controller connected to the four-way valve, the pressure regulator, and the stop valve, the controller configured to calculate the calorific power required from the temperature of the outside atmosphere, the temperature within the cabin, and the desired cabin temperature, and to regulate the mass of fluid flowing into the evaporator to obtain the calorific power required by regulating the pressure at the inlet of the evaporator, and closing the stop valve temporarily when the mass of fluid in the heating circuit is insufficient and thereby transferring fluid from the condenser to the heating circuit.

30. A motor vehicle, comprising:
   a passenger cabin;
   a propulsion engine for releasing heat into the cabin during operation; and
   an air conditioning installation including (1) a cooling circuit containing an evaporator, a compressor, and a condenser, (2) a heating circuit containing said evaporator, said compressor, and a controlled pressure regulator adapted to regulate mass of fluid flowing into the evaporator, (3) control valve configured to establish the cooling circuit or the heating circuit, and (4) a fluid conduit connecting the condenser and the heating circuit to provide additional fluid when the flow of fluid into the evaporator provides insufficient calorific power.

* * * * *